(12) United States Patent
Greene et al.

(10) Patent No.: US 12,536,541 B2
(45) Date of Patent: Jan. 27, 2026

(54) VIRTUAL CASH WITH FLAGGING OR TRACKING OF SUSPICIOUS TRANSACTIONS

(71) Applicant: Bank of America Corporation, Charlotte, NC (US)

(72) Inventors: Steven Greene, New York, NY (US); Kerry Vaughan, Pennington, NJ (US); Srinath Chakravarty, Plano, TX (US); Aravind Shankaragouda Singtalur, McKinney, TX (US); Dinesh Kumar Agrawal, Rowlett, TX (US); Stephen Belton, Garden City, NY (US); Kenneth Boyd, Richmond, VA (US); Petar Puskarich, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 155 days.

(21) Appl. No.: 18/100,673

(22) Filed: Jan. 24, 2023

(65) Prior Publication Data

US 2024/0249288 A1  Jul. 25, 2024

(51) Int. Cl.
*G06Q 20/40* (2012.01)
*G06Q 20/10* (2012.01)
*G06Q 20/36* (2012.01)
*G06Q 20/42* (2012.01)

(52) U.S. Cl.
CPC ......... *G06Q 20/4016* (2013.01); *G06Q 20/10* (2013.01); *G06Q 20/3678* (2013.01); *G06Q 20/40145* (2013.01); *G06Q 20/42* (2013.01); *G06Q 2220/00* (2013.01)

(58) Field of Classification Search
CPC ............ G06Q 20/00–425; G06Q 2220/00–18
See application file for complete search history.

(56) References Cited

U.S. PATENT DOCUMENTS

| | | | | |
|---|---|---|---|---|
| 8,589,285 | B2 * | 11/2013 | Monk ................. | G06Q 20/405 |
| | | | | 705/30 |
| 10,769,625 | B2 * | 9/2020 | Pandiarajan ....... | G06Q 20/3274 |
| 11,151,527 | B2 * | 10/2021 | Benkreira ............ | G06Q 20/065 |
| 11,164,181 | B2 * | 11/2021 | Li ............................. | H04L 9/50 |
| 11,281,776 | B2 * | 3/2022 | Todasco ............... | G06K 7/1417 |
| 11,562,336 | B2 * | 1/2023 | Min, I ................ | G06Q 20/4014 |
| 11,727,377 | B2 * | 8/2023 | Millius ................ | G06Q 20/065 |
| | | | | 705/16 |

(Continued)

*Primary Examiner* — Chenyuh Kuo
(74) *Attorney, Agent, or Firm* — Weiss & Arons LLP

(57) ABSTRACT

A method for transferring a good or service from a d+b wallet-supporting vendor to a user registered with a digital+bitcoin (d+b) wallet is provided. The user may be registered with a cryptocurrency provider and a value allocation. The method may receive, at the vendor, a user request configured for a cryptocurrency-based transaction. The method may transmit, a consent to transact the cryptocurrency-based transaction and, in response to the transmitting of the consent to transact, receive, from the user device, a Quick Response (QR) code. The code specifies: a) an amount of cryptocurrency; and b) a product or a service to be exchanged for the amount of cryptocurrency. Prior to transferring the value, the method may flag the transfer of the value as suspicious when the QR code received by the user has been identified as a fraudulent QR code. The flagging may terminate the transfer.

4 Claims, 7 Drawing Sheets

(56) References Cited

U.S. PATENT DOCUMENTS

| | | | |
|---|---|---|---|
| 11,748,757 B1* | 9/2023 | Segal | G06Q 20/34 |
| | | | 705/44 |
| 11,989,722 B2* | 5/2024 | Kinsey | G06Q 20/381 |
| 2013/0024361 A1* | 1/2013 | Choudhuri | G06Q 40/02 |
| | | | 705/39 |
| 2015/0356555 A1* | 12/2015 | Pennanen | G06Q 20/4014 |
| | | | 705/71 |
| 2019/0034889 A1* | 1/2019 | Brock | G06Q 20/20 |
| 2019/0392452 A1* | 12/2019 | Jivraj | G06Q 20/326 |
| 2021/0350373 A1* | 11/2021 | Spalding | G06Q 20/381 |
| 2023/0012460 A1* | 1/2023 | Hipp | G06Q 20/4016 |
| 2023/0060068 A1* | 2/2023 | Sinha | G06Q 20/383 |
| 2024/0135339 A1* | 4/2024 | Gooneratne | G06Q 20/4016 |

* cited by examiner

VIRTUAL CASH WITH FLAGGING OR TRACKING OF SUSPICIOUS TRANSACTIONS

FIELD OF TECHNOLOGY

Aspects of the disclosure relate to transacting using mechanisms other than cash and known payment instruments.

BACKGROUND OF THE DISCLOSURE

Currently the only transactions that provide anonymity to the purchaser for value are cash-based transactions.

However, cash-based transactions are not always convenient for the purchaser at least because the purchaser must take the security risk of carrying cash at all times. Furthermore, the purchaser cannot purchase product or services remotely because of the need for a hand-to-hand cash transfer. Along the same lines, a purchaser for cash cannot take advantage of such systems as the Internet, which allow the purchaser to transact with and purchase from a remote product vendor.

While cash provides the advantage of supporting anonymous transfers for value, nevertheless, the drawbacks associated with cash transactions make finding other anonymous transaction solutions attractive.

It would be desirable for example to provide a digital wallet that enables a user to transact anonymously.

It would be further desirable for example to provide a digital wallet that leverages the anonymity associated with bitcoin, or other more secure variants, such as a StableCoin, in order to support anonymous transactions.

StableCoin refers to cryptocurrency which has a value that is pegged, or tied, to that of another currency, commodity or financial instrument. StableCoins pursue price stability by maintaining reserve assets as collateral or through algorithmic formulas that are intended to control supply. Stablecoins aim to provide an alternative to the high volatility of the most popular cryptocurrencies, including Bitcoin (BTC), which has, recently, made crypto holdings less suitable for common transactions while, at the same time provide the anonymity associated with other cryptocurrencies.

SUMMARY

A digital+bitcoin (d+b) wallet system is provided. The system may include a processor for controlling a receiver and a transmitter.

The receiver may receive a user registration for the d+b wallet. The receiver may receive a value allocation from the user to the d+b wallet and may receive from the user a request for a cryptocurrency transaction with a d+b wallet-supporting vendor.

The transmitter may be used to transmit the user registration to a partner cryptocurrency provider. The receiver may also receive a consent to transact from the d+b wallet-supporting vendor.

The receiver and the transmitter may be further configured to collaborate to exchange Quick Response (QR) codes between the customer and the d+b wallet-supporting vendor. Each of the QR codes may be encoded with a) an amount of cryptocurrency greater than or equal to a value necessary for the purchase, and b) a product or a service to be provided, in return for the amount of cryptocurrency, by the d+b wallet-supporting vendor to the user.

In response to exchanges scans of the QR codes between the customer and the d+b wallet-supporting vendor, the method may further include prompting the user to provide a biometric characteristic to confirm the cryptocurrency transaction.

The receiver may be further configured to receive the biometric characteristic from the user and, in response to receiving the biometric characteristic, the processor may be further configured to procure the amount of cryptocurrency from the cryptocurrency provider and transfer in the form of cryptocurrency using the transmitter the value necessary for the purchase to the d+b wallet-supporting vendor. The receiver may be yet further configured to receive from the d+b wallet-supporting vendor a confirmation of receipt of the cryptocurrency. In addition, the receiver may also be further configured to receive a delivery schedule for the good or service received in return for the cryptocurrency.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
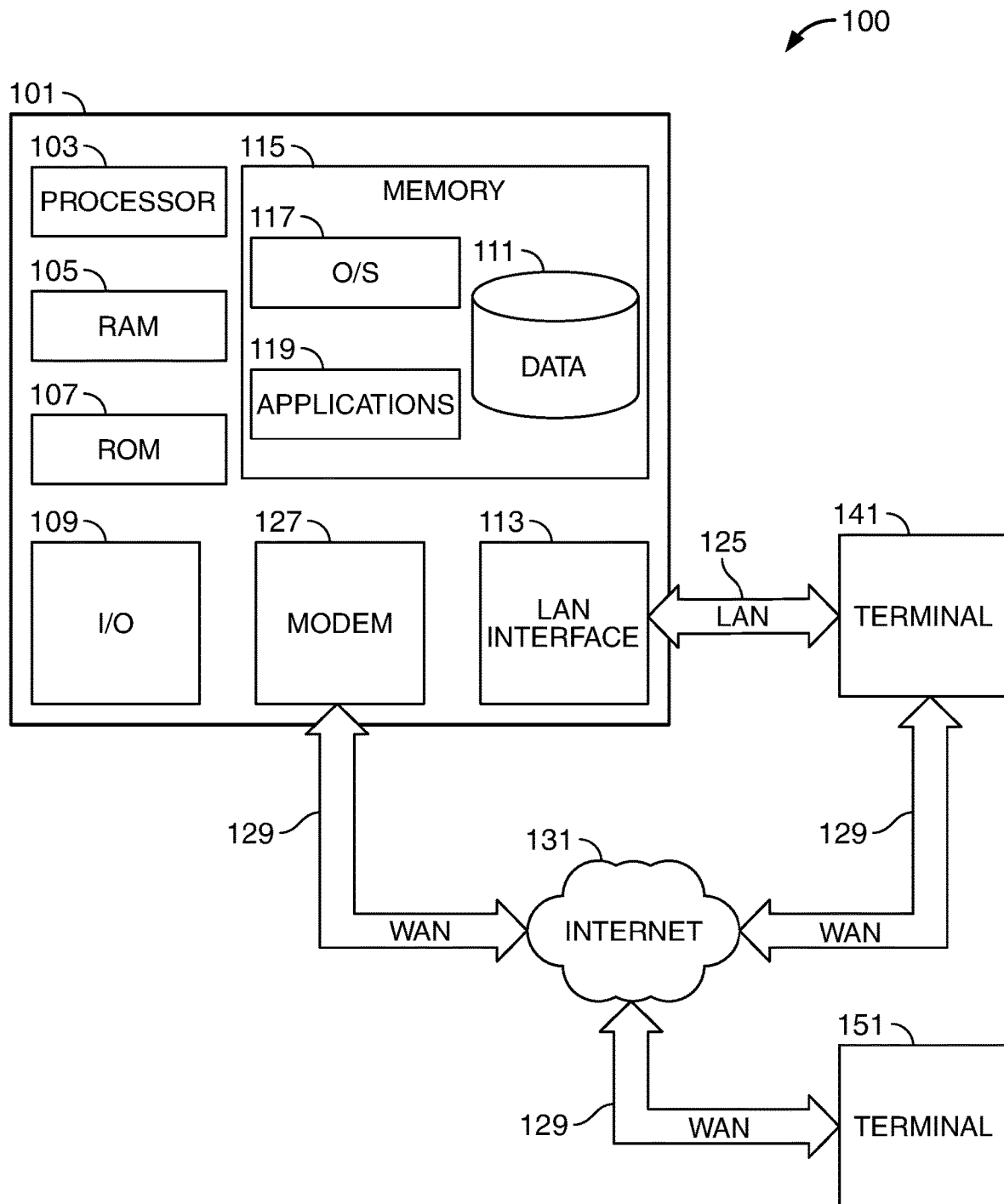
FIG. 1 shows an illustrative system in accordance with principles of the disclosure.

A method for providing a digital+bitcoin (d+b) wallet is provided. The method may include receiving a user registration for the d+b wallet, configuring the user registration with a partner cryptocurrency provider, receiving a value allocation from the user to the d+b wallet, receiving from the user a request for a cryptocurrency transaction with a d+b wallet-supporting vendor, receiving a consent to transact from the d+b wallet-supporting vendor, and exchanging Quick Response (QR) codes between the customer and the d+b wallet-supporting vendor.

Each of the QR codes is preferably encoded with: a) an amount of cryptocurrency greater than or equal to a value necessary for the purchase, and b) a product or a service to be provided by the d+b wallet-supporting vendor to the user.

In response to receiving the scan of the QR code received by the user and in response to the scan of the QR code received by the d+b wallet-supporting vendor, the method may also include prompting the user to provide a biometric characteristic to confirm the cryptocurrency transaction. In response to receiving the biometric characteristic, the method may include procuring the amount of cryptocurrency from the cryptocurrency provider, transferring, in the form of cryptocurrency, the value necessary for the purchase to the d+b wallet-supporting vendor and, optionally, receiving from the d+b wallet-supporting vendor a confirmation of receipt of the cryptocurrency. It should be noted that the confirmation of receipt should preferably be transaction data agnostic.

In certain embodiments, the method may include receiving from the d+b wallet-supporting vendor a confirmation of receipt of the cryptocurrency and/or receiving a confirmation from the d+b wallet-supporting vendor that the cryptocurrency has been auto-converted to a second currency. The method may temporarily, or permanently, store the confirmation of the receipt of the cryptocurrency pending receipt by the user of the product or service. It should be noted that, in the case of receiving a confirmation from the d+b wallet-supporting vendor that the cryptocurrency has been auto-converted to a second currency, the confirmation of receipt should preferably be transaction data agnostic.

Certain methods according to the disclosure may include receiving a user registration for the d+b wallet, configuring the user registration with a partner cryptocurrency provider, receiving a value allocation, from the user, to the d+b wallet, receiving from the user a request for a cryptocurrency transaction with a d+b wallet-supporting vendor, receiving a consent to transact from the d+b wallet-supporting vendor, activating a Quick Response (QR) code feature on the d+b wallet at the user device for an amount that is less than or equal to the value allocation, and exchanging Quick Response (QR) codes between the customer and the d+b wallet-supporting vendor.

Each of the QR codes may preferably be encoded with a) an amount of cryptocurrency greater than or equal to a value necessary for the purchase and/or b) a product or a service to be provided by the d+b wallet-supporting vendor to the user in exchange for the amount of cryptocurrency. In response to receiving a scan of the QR codes between the customer and the d+b wallet-supporting vendor, the method may prompt the user to provide a biometric characteristic to confirm the cryptocurrency transaction and then, following the prompting, receive the biometric characteristic from the user.

In response to receiving the biometric characteristic, the method may procure the amount of cryptocurrency from the cryptocurrency provider, transfer, in the form of cryptocurrency, the value necessary for the purchase to the d+b wallet-supporting vendor and receive from the d+b wallet-supporting vendor a confirmation of receipt of the cryptocurrency, as detailed above.

In certain embodiments, the systems and methods set forth herein may preferably flag transactions and/or patterns of transactions as possibly suspicious. Such flagging may preferably limit abuse by reducing and/or eliminating the misuse of substantially anonymous transactions. Such substantially anonymous transactions are described herein for money laundering or other similar behavior.

Flagging of suspicious virtual cash transactions may involve one or more of the following: identifying fraudulent QR code transfers, determining the occurrence of attempted suspicious Bitcoin withdrawals, falsifying registry information related to registered vendors and/or registered avatars, repeated unsuccessful attempts to engage the virtual cash transaction system, and other similar attempts to defraud the system.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
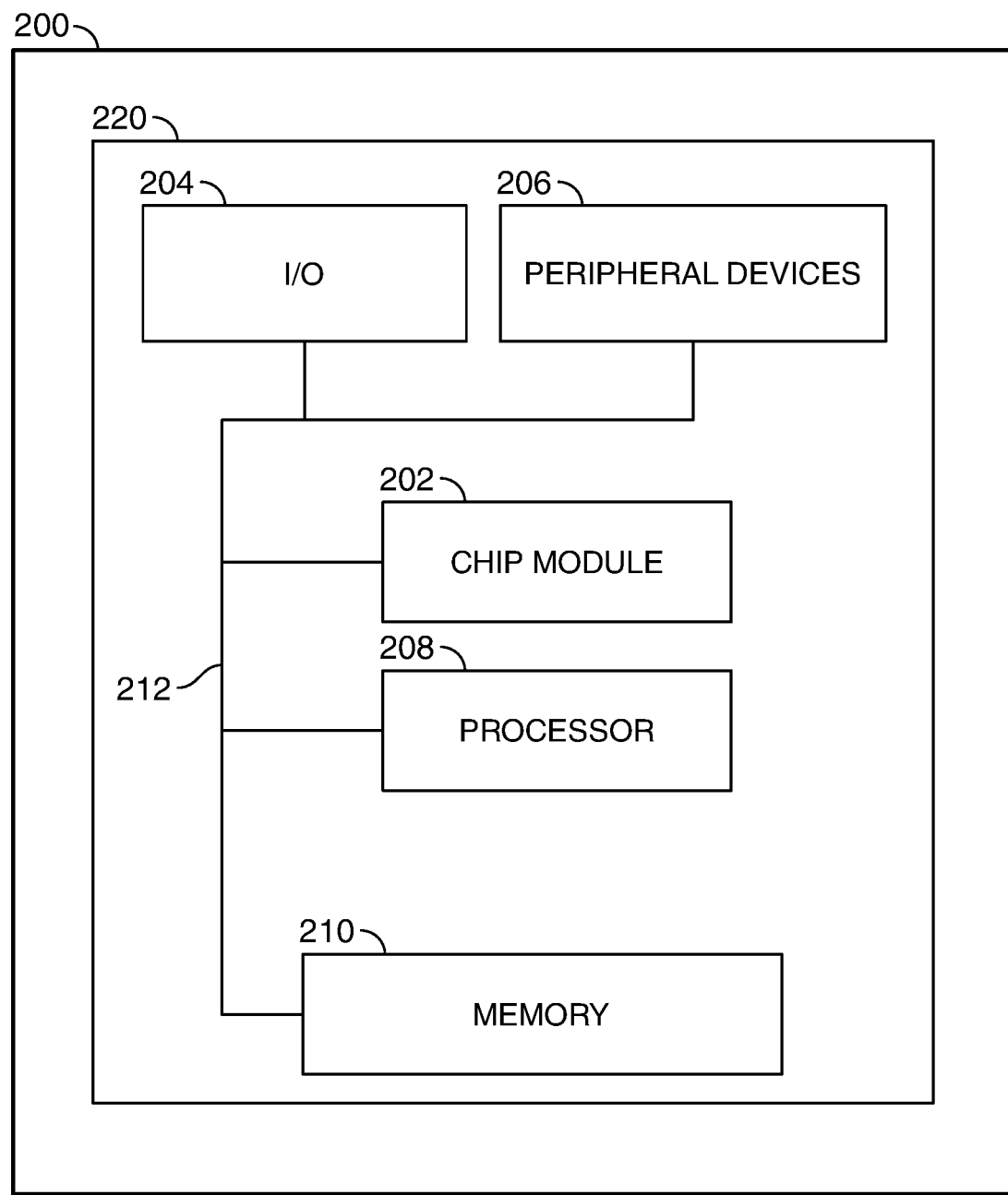
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
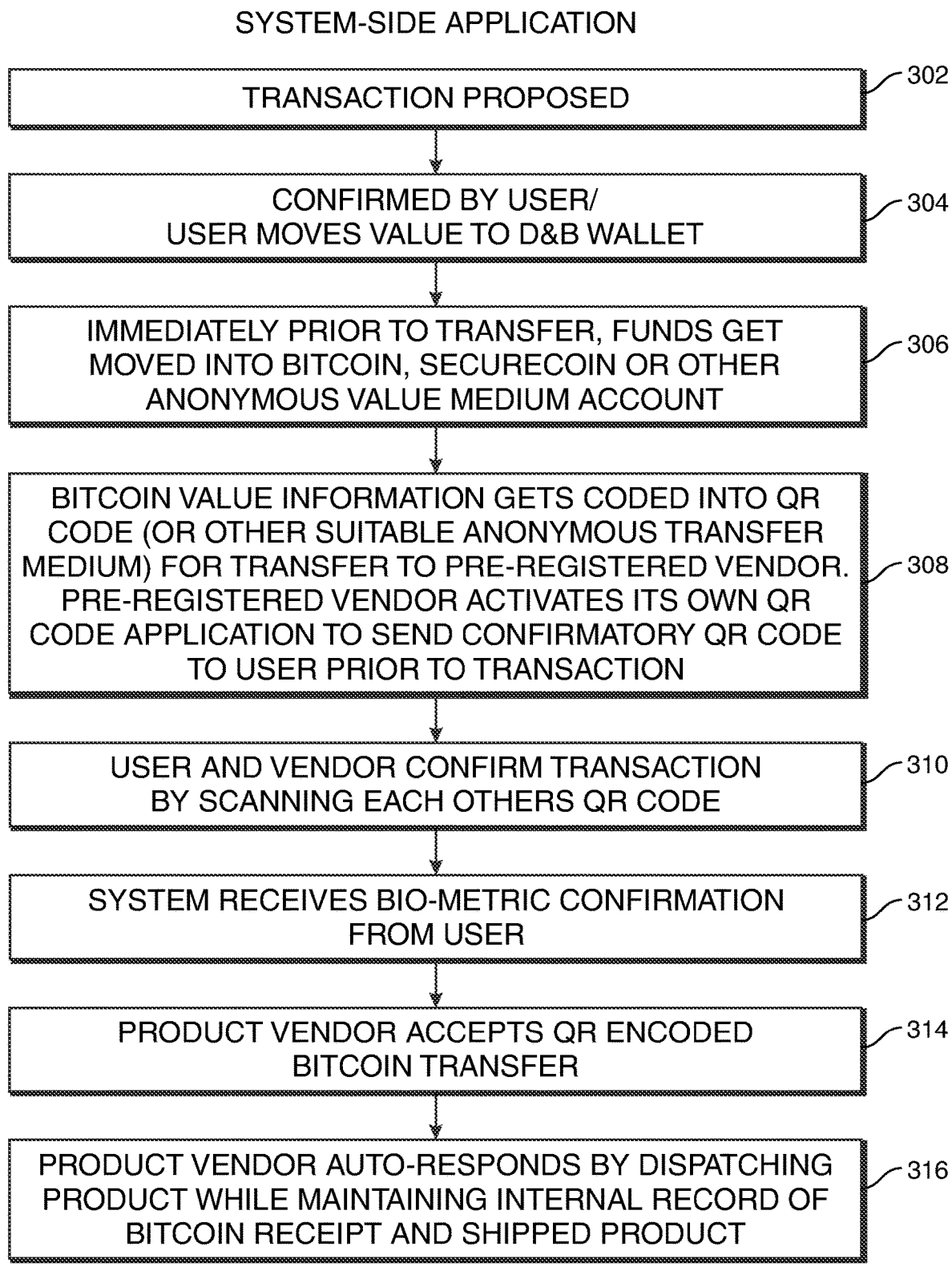
FIG. 3 shows an illustrative flow diagram of a system-side application in accordance with the principles of the disclosure.

FIG. 3 shows an illustrative flow diagram of a system-side application in accordance with the principles of the disclosure. At 302, a user configures a potential transaction—i.e., a transaction is proposed.

At 304, the user confirms the particulars of the transaction. Then, the user, checks his D+B wallet to see if sufficient value is stored therein to fund the transaction. If there is sufficient value stored to fund the transaction, the transaction proceeds on to step 306. If not, the user may be instructed or otherwise prompted to move sufficient value to the wallet to cover the transaction.

Preferably immediately prior to value transfer associated with the transaction, funds may be converted into Bitcoin, Securecoin or other anonymous value medium account associated with a user anonymous value account, as shown at 306. At 308, Bitcoin, or other suitable value information, may get coded into a QR code for transfer to a pre-registered vendor. The pre-registered vendor may optionally activate its own QR code application to send a confirmatory QR code to user prior to transaction.

At 310, the user and vendor may confirm the transaction by scanning the code they received from each other. Alternatively, the QR aspect of the system could be operational in only one direction—i.e., with a single QR code, and scanning of same, being used a trigger to launch the transaction.

As a final confirmatory step in the transaction, the system may receive a bio-metric confirmation from user, as shown at 312. Such a bio-metric confirmation may include receiving an iris scan, receiving an electronic file associated with a fingerprint of the user, or any other suitable electronic record or file of a biometric characteristic associated with the user.

Once the transaction is fully confirmed by the receiving of the file corresponding to the biometric characteristic, the product (or service) vendor may accept the QR encoded Bitcoin transfer, as shown at 314. Because the transfer is in the form of a transmission of a QR encoded Bitcoin transfer, the record of the transaction will preferably appear as a QR encoded, Bitcoin-based, transmission from the user, independent of any record of a financial transaction from the user side.

In certain embodiments, the product vendor may auto-respond to a transfer in the form of a transmission of a QR encoded Bitcoin transfer, as set forth herein, by dispatching product (or arranging, performing or dispatching a service) while maintaining an internal record of a Bitcoin receipt as well as maintaining an internal record by shipping the product, as shown in 316. The user/purchaser, on the other hand, may preferably not maintain or preserve any record of the transaction other than an outgoing bitcoin transfer via QR code or other suitable anonymous transfer mechanism.

Figure 4:
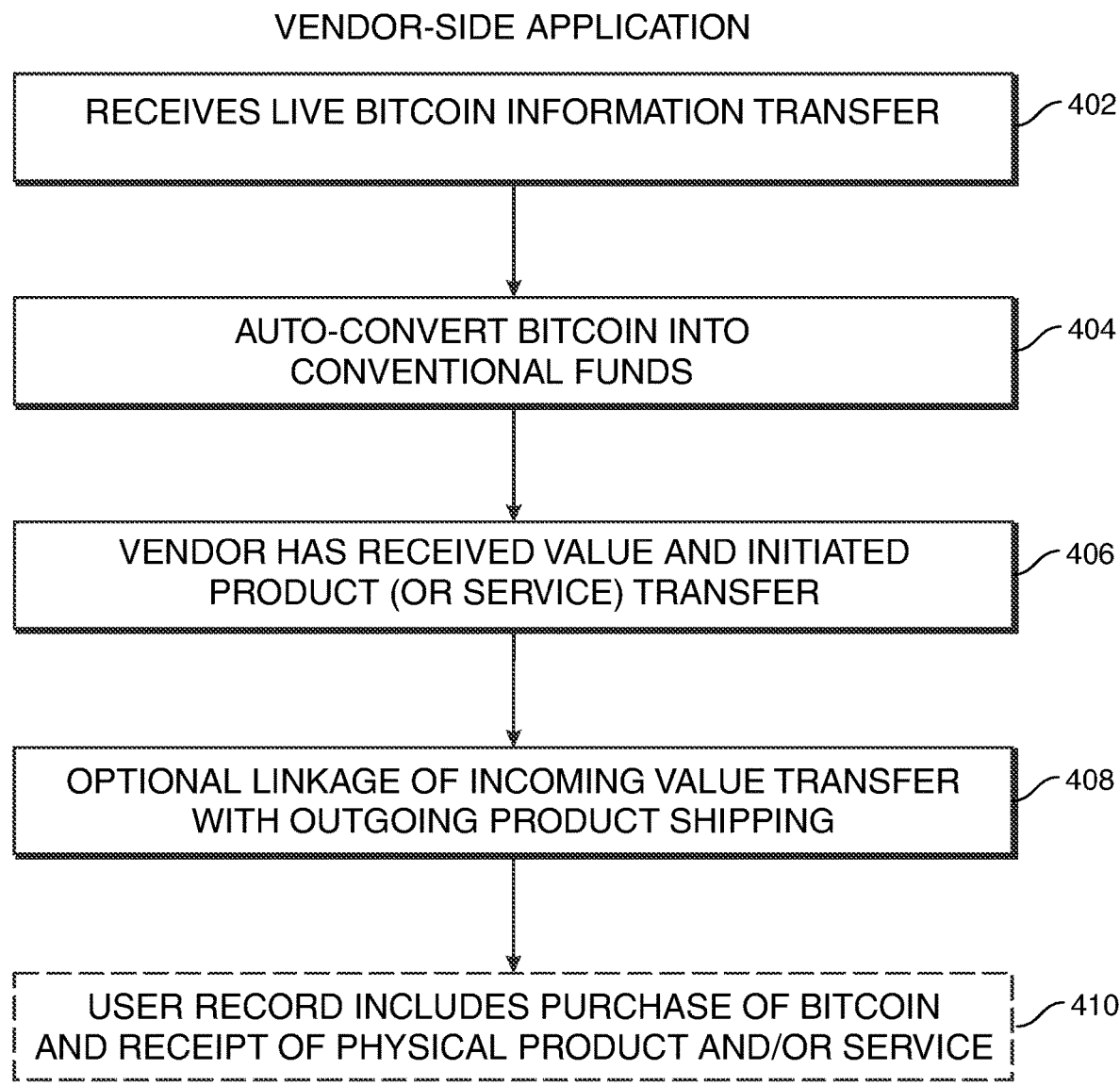
FIG. 4 shows an illustrative flow diagram of a vendor-side application in accordance with the principles of the disclosure.

FIG. 4 shows an illustrative flow diagram of a vendor-side application in accordance with the principles of the disclosure. At 402 the vendor may receive a live Bitcoin information transfer. Such a transfer may be actualized in the form of a QR code or other suitable transfer mechanism.

Following the receipt of the Bitcoin information transfer, the vendor-side application may auto-convert the Bitcoin into conventional funds. This auto-conversion may preferably immediately occur upon receipt of the Bitcoin information transfer, as shown at 404.

At 406, the vendor has preferably received value and initiated product (or service) transfer.

With respect to the electronic record keeping of the vendor, an optional linkage may be formed, as shown at 408, between the incoming value transfer and the outgoing product shipping. Alternatively, the vendor may decline to associate the two occurrences—i.e., the incoming value transfer and the outgoing product shipping.

It should be noted that the user records may include purchase of bitcoin, transfer of QR code and receipt of product and/or service, as shown at 410. Here as well the user may form an optional linkage between the outgoing value transfer and the incoming product receipt. Alternatively, the user may decline to associate the two occurrences—i.e., the outgoing value transfer and the incoming product receipt. As such the user's records will be agnostic to the occurrence of any cryptocurrency transactions.

Figure 5:
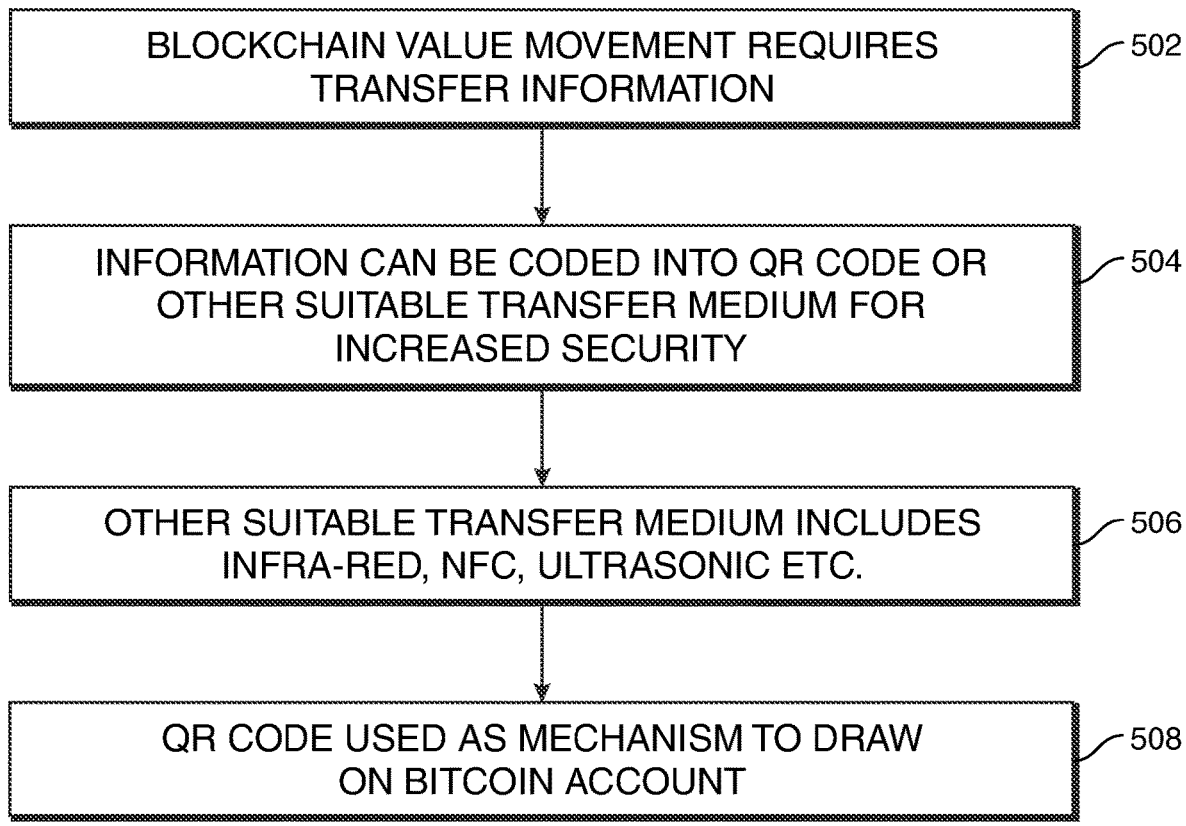
FIG. 5 shows an illustrative flow diagram of a QR code aspect of an application in accordance with the principles of the disclosure.

FIG. 5 shows an illustrative flow diagram of a QR code aspect of an application in accordance with the principles of the disclosure. At 502, a blockchain value movement may be implemented using such value as one or more cryptocurrencies.

Information can be coded for such a transfer into a QR code or other suitable transfer medium for increased security, as shown at 504. Other suitable transfer medium may include an infra-red medium, Near-Field Communication Medium (NFC), ultrasonic medium or other suitable cryptocurrency transfer, as shown at 506.

At 508, a QR code may be used by a vendor as a mechanism to draw on a user Bitcoin account. The QR code should preferably include all information necessary to enable a vendor to draw, to the extent authorized by the purchase instructions, on a cryptocurrency account associated with the user/purchaser.

Figure 6:
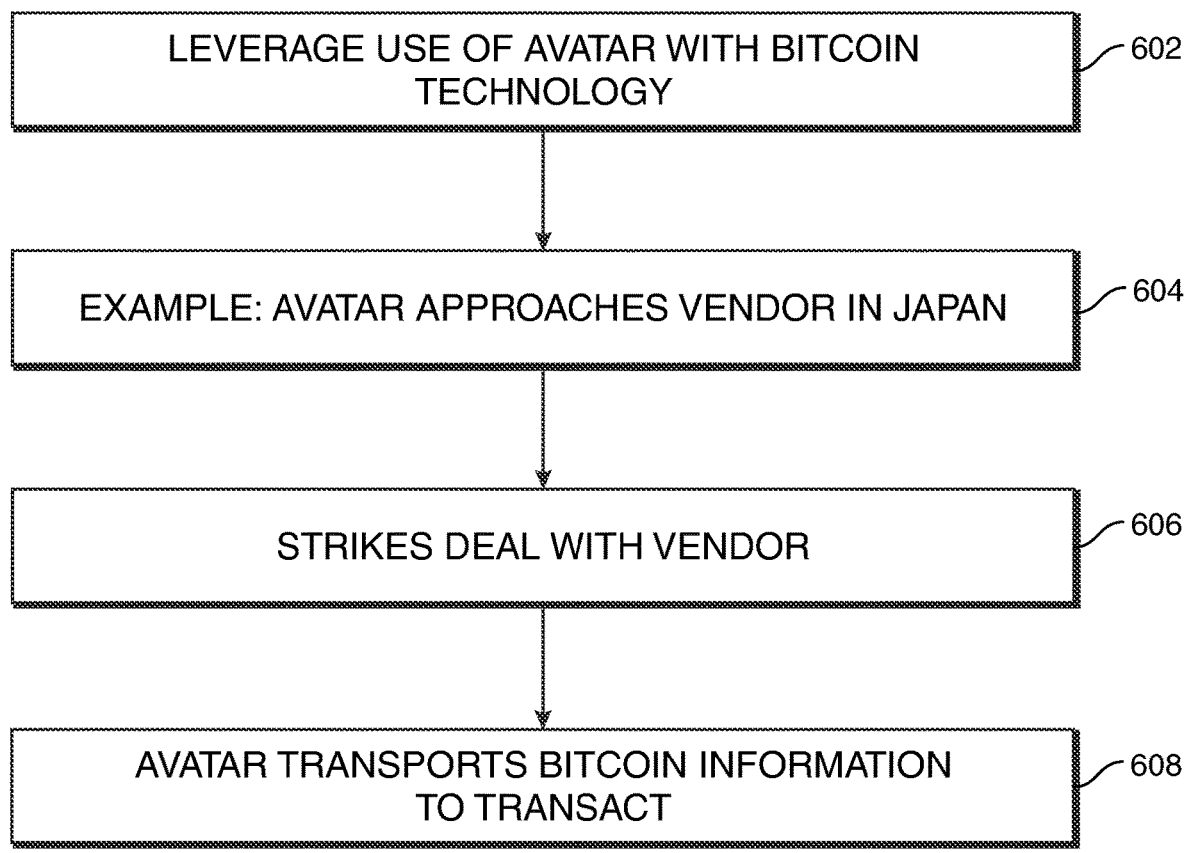
FIG. 6 shows an illustrative flow diagram of a meta-verse application in accordance with the principles of the disclosure.

FIG. 6 shows an illustrative flow diagram of a meta-verse application in accordance with the principles of the disclosure. At 602, the meta-verse aspect is shown leveraging use of a meta-verse based avatar capable of exchanging cryptocurrency or other Bitcoin value technology.

At 604, an example is shown in which an avatar approaches a vendor in Japan, and confirms the specifics of a purchase with the vendor at 606. The avatar may be used to transport bitcoin information to be transacted, as shown at 608.

The remaining portions of the transactions may be used in accordance with the other embodiments shown herein. More specifically, and as mentioned above, the illustrative embodiment shown in any of the figures may include features shown in connection with another illustrative embodiment.

As described herein, an objective of the current disclosure is to ensure relatively easy, safe and secure transactions with anonymity. The use of biometric authentication (e.g., in combination with a mobile phone) has been described herein as layered with QR-Code and Blockchain technologies. Furthermore, the D+B Wallet protects the systems and methods described herein from utilization by non-authorized personnel while maintaining this above-described anonymity.

As the disclosure extends to usage on the Internet/Web3, one aspect of the disclosure may involve an Avatar registry, as follows. Such a registry may preferably limit the systems and methods to use that is exclusively associated to registered accounts.

One possible scenario according to the subject matter of the disclosure may be outlined as follows:

individuals want to use virtual cash on Internet/Web3 for procurement of goods and/or services;

They must create an approved avatar which is part of a secured registry (Similar to blockchain in its native form);

Via the same registered account that users currently utilize for virtual cash, the created avatar can purchase goods or services; and, finally;

The avatar, or other accounts described herein, can preferably only transact online up to a threshold amount (pre-determined). That amount can further secure the systems and methods described herein so as to avoid a fraudulent, or otherwise suspicious, activity.

This layered approach will continue to mitigate abuse by ever increasing suspicious actors seeking to compromise technology.

Figure 7:
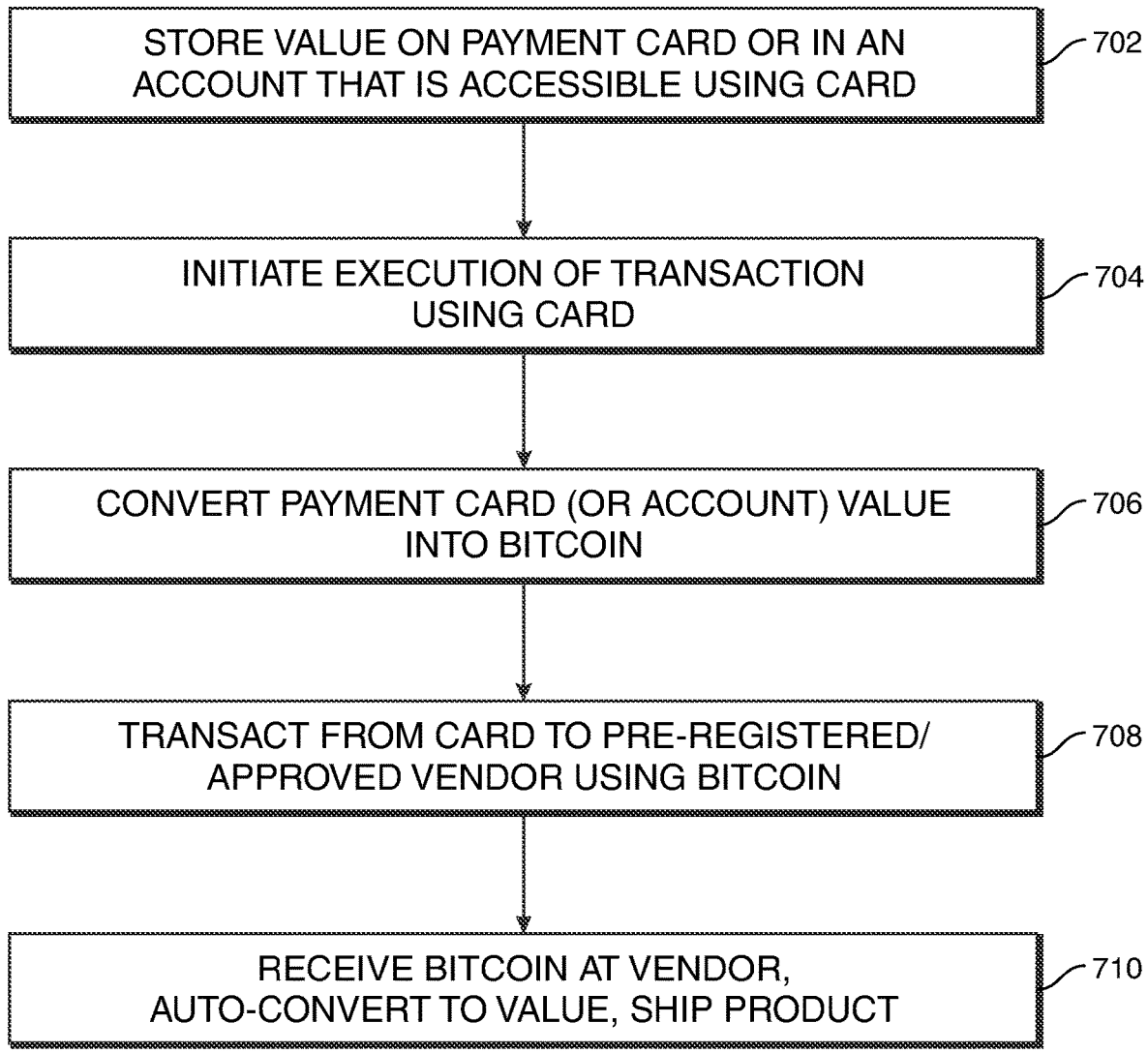
FIG. 7 shows an illustrative flow diagram of a stored payment/card limited value application in accordance with the principles of the disclosure.

FIG. 7 shows an illustrative flow diagram of a stored payment/card limited value application in accordance with the principles of the disclosure.

At 702, the aspect of stored value on a payment or in an account that is accessible using a card is shown. At 704, the system preferably initiations execution of a transaction using a payment card according to the disclosures set forth herein.

As a pre-cursor to the execution of a transaction according to the systems and methods set forth herein the payment card (or associated account) value is converted to Bitcoin, as shown at 706.

Then, at 708, the transaction is implemented using the card which has been pre-registered to and/or approved by a vendor using Bitcoin. The scope of such embodiments typically includes transacting Bitcoin by leveraging the information stored on the stored payment card, or other payment instrument. Alternatively, the scope of such embodiments may include transacting using Bitcoin that has been withdrawn from a stored value card and deposited or otherwise stored in a second location.

Preferably independent of the way the value is transferred, the vendor may receive the Bitcoin at 710 and preferably auto-convert the Bitcoin to a different currency. Thereafter, the vendor preferably is in a fully-compensated position such that the vendor can ship the product or service that was agreed upon prior to execution by the seller.

Thus, methods and apparatus for a D(DIGITAL)+B(BITCOIN) WALLET are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for transferring a good or service from a d+b wallet-supporting vendor to a user registered with a digital+ bitcoin (d+b) wallet, a user registration with the d+b wallet being further registered with a cryptocurrency provider and provided with a value allocation, the method comprising:

receiving, by a computi ng device of the d+b wallet-supporting vendor, a user request from a user device of the user, wherein the request is for a cryptocurrency-based transaction with the d+b wallet-supporting vendor;

receiving, by the user device, a consent to transact the cryptocurrency-based transaction with the d+b wallet-supporting vendor;

generating, by the user device, a Quick Response (QR) code for the cryptocurrency-based transaction;

scanning, by the computing device of the d+b wallet-supporting vendor, from the user device, the Quick Response (QR) code, wherein the QR code comprises information of:
a) an amount of cryptocurrency greater than or equal to a value necessary to complete the transaction and less than or equal to the value allocation; and
b) a product or a service to be provided by the d+b wallet-supporting vendor to the user in exchange for the amount of cryptocurrency;

receiving, by a system, the QR code for the cryptocurrency-based transaction;

prompting, by the system, the user to provide a biometric characteristic to confirm the cryptocurrency-based transaction in response to receiving the QR code;

receiving, by the system, the biometric characteristic from the user to confirm the cryptocurrency-based transaction; and prior to transferring the value in cryptocurrency to the d+b supporting vendor for the cryptocurrency-based transaction, identifying, by the system, that an occurrence of a threshold number of attempted unauthorized cryptocurrency withdrawals associated with the value necessary to complete the transaction exceeds a threshold;

identifying, by the system, that the QR code is a fraudulent QR code transfer associated with the occurrence of the threshold number of attempted unauthorized cryptocurrency withdrawals associated with the value necessary to complete the transaction;

in response to the identifying, flagging, by the system, a transfer of value for the cryptocurrency-based transaction as a suspicious virtual cash transfer, wherein flagging the transfer value further comprises terminating the transfer of value to the d+b supporting vendor for the cryptocurrency-based transaction;

receiving, by the system, a second QR code for a second cryptocurrency-based transaction executed between the user device and the d+b wallet-supporting vendor;

based on determining that less than a threshold number of attempted unauthorized cryptocurrency withdrawals have occurred, completing, by the system, a transfer of second value for the second cryptocurrency-based transaction to the vendor; and upon completing the transfer of second value for the second cryptocurrency-based transaction to the vendor, receiving, by the system, from the computing device of the d+b wallet-supporting vendor a confirmation of receipt of the cryptocurrency from the d+b wallet, wherein the confirmation of the receipt of cryptocurrency is transaction data agnostic;

wherein completing the transfer further comprises auto-converting the cryptocurrency to a second currency.

2. The method of claim 1 further comprising:
identifying, by the system, falsified registry information associated with the vendor and, in response thereto, flagging the transfer of value as a suspicious virtual cash transfer and terminating the transfer of value.

3. The method of claim 1 further comprising:
identifying, by the system, an occurrence of an attempted unauthorized cryptocurrency withdrawal associated with the transfer of value, and, in response thereto, flagging the transfer of value as a suspicious virtual cash transfer and terminating the transfer of value.

4. The method of claim 1 further comprising:
receiving, by the system from the computing device of the d+b wallet-supporting vendor, a plurality of unauthorized attempts to engage in virtual cash transactions associated with the user; and removing, by the system, the d+b wallet-supporting vendor from a vendor registry based on the plurality of unauthorized attempts to engage in virtual cash transactions.

\* \* \* \* \*